US010369750B2

(12) United States Patent
Soccard

(10) Patent No.: US 10,369,750 B2
(45) Date of Patent: Aug. 6, 2019

(54) DEVICE AND PROCESS FOR WELDING THERMOPLASTIC COMPOSITE MATERIAL PARTS

(71) Applicant: AIRBUS SAS, Blagnac (FR)

(72) Inventor: Eric Soccard, Blain (FR)

(73) Assignee: Airbus SAS, Blagnac (FR)

( * ) Notice: Subject to any disclaimer, the term of this patent is extended or adjusted under 35 U.S.C. 154(b) by 191 days.

(21) Appl. No.: 15/127,363

(22) PCT Filed: Mar. 19, 2015

(86) PCT No.: PCT/EP2015/055850
§ 371 (c)(1),
(2) Date: Sep. 19, 2016

(87) PCT Pub. No.: WO2015/140270
PCT Pub. Date: Sep. 24, 2015

(65) Prior Publication Data
US 2017/0129163 A1 May 11, 2017

(30) Foreign Application Priority Data
Mar. 20, 2014 (FR) ..................................... 14 52303

(51) Int. Cl.
*B29C 65/46* (2006.01)
*B29C 65/00* (2006.01)
(Continued)

(52) U.S. Cl.
CPC ............ *B29C 65/46* (2013.01); *B29C 65/364* (2013.01); *B29C 65/368* (2013.01);
(Continued)

(58) Field of Classification Search
CPC ... B29C 65/46; B29C 65/7847; B29C 66/524; B29C 65/364; B29C 65/3676;
(Continued)

(56) References Cited

U.S. PATENT DOCUMENTS 4,978,825 A 12/1990 Schmidt et al.
5,047,605 A * 9/1991 Ogden ................. B29C 65/18
156/273.7
(Continued)

FOREIGN PATENT DOCUMENTS

CN 103406419 11/2013
DE 102012100620 7/2013
(Continued)

OTHER PUBLICATIONS

EP 1892078A1 Machine Translation of Description.*
(Continued)

*Primary Examiner* — Christopher T Schatz
*Assistant Examiner* — Cynthia L Schaller
(74) *Attorney, Agent, or Firm* — Greer, Burns & Crain, Ltd.

(57) ABSTRACT

The device for welding thermoplastic parts includes a matrix for positioning the parts to be assembled, the matrix including an amagnetic insulating insert that defines joining zones in which the welds must be produced, a bladder defining a sealed volume and means for producing a partial vacuum in the sealed volume, and means for moving a magnetic induction head to near the joining zones and without making contact with the bladder. The welding process includes positioning at least one first part, then of placing metal inserts on areas of the first part corresponding to the joining zones that must be welded, and then positioning at least one second part. A bladder is put in place covering the parts and a partial vacuum is created in the volume defined by the bladder. The magnetic induction head is moved to produce the weld bead without contact while the partial vacuum is maintained.

9 Claims, 3 Drawing Sheets

(51) Int. Cl.
B29C 65/36 (2006.01)
B29C 65/78 (2006.01)
B29K 705/00 (2006.01)

(52) U.S. Cl.
CPC ...... *B29C 65/3676* (2013.01); *B29C 65/7841* (2013.01); *B29C 65/7847* (2013.01); *B29C 66/004* (2013.01); *B29C 66/0044* (2013.01); *B29C 66/00145* (2013.01); *B29C 66/112* (2013.01); *B29C 66/131* (2013.01); *B29C 66/3472* (2013.01); *B29C 66/3494* (2013.01); *B29C 66/474* (2013.01); *B29C 66/524* (2013.01); *B29C 66/721* (2013.01); *B29C 66/73921* (2013.01); *B29C 66/8126* (2013.01); *B29C 66/81431* (2013.01); *B29C 66/81455* (2013.01); *B29C 66/81463* (2013.01); *B29C 66/81821* (2013.01); *B29C 66/81825* (2013.01); *B29C 66/836* (2013.01); *B29C 66/863* (2013.01); *B29C 66/91651* (2013.01); *B29C 66/8122* (2013.01); *B29C 66/934* (2013.01); *B29K 2705/00* (2013.01); *B29K 2995/0008* (2013.01)

(58) Field of Classification Search
CPC ............... B29C 66/863; B29C 66/836; B29C 66/81825; B29C 66/81821; B29C 66/81463; B29C 66/81455; B29C 66/81431; B29C 65/368; B29C 66/73921; B29C 66/721; B29C 66/474; B29C 66/8126; B29C 66/3494; B29C 66/3472; B29C 66/131; B29C 66/112; B29C 66/0044; B29C 66/004; B29C 66/00145; B29C 65/7841; B29C 66/91651; B29C 66/8122; B29C 66/934; B29K 2705/00; B29K 2995/0008

See application file for complete search history.

(56) References Cited

U.S. PATENT DOCUMENTS

| | | | |
|---|---|---|---|
| 5,710,414 A * | 1/1998 | Matsen | B21D 26/021 219/633 |
| 5,916,469 A * | 6/1999 | Scoles | B29C 65/5057 219/603 |
| 5,935,475 A | 8/1999 | Scoles et al. | |
| 2002/0038687 A1* | 4/2002 | Anderson | B29C 65/5042 156/275.7 |
| 2011/0272852 A1* | 11/2011 | Blot | B29C 33/48 264/257 |
| 2012/0291948 A1 | 11/2012 | Matsen et al. | |

FOREIGN PATENT DOCUMENTS

| | | |
|---|---|---|
| EP | 1892078 A1 * | 2/2008 |
| NL | 1030304 | 5/2007 |
| WO | 9640487 | 12/1996 |

OTHER PUBLICATIONS

EP 1892078 Machine Translation of Claims.*
International Search Report, International Application No. PCT/EP2015/055850, dated Jun. 12, 2015.

* cited by examiner

DEVICE AND PROCESS FOR WELDING THERMOPLASTIC COMPOSITE MATERIAL PARTS

CROSS-REFERENCE TO RELATED APPLICATIONS

This application is the National Stage of International Application No. PCT/EP2015/055850, having an International Filing Date of 19 Mar. 2015, which designated the United States of America, and which International Application was published under PCT Article 21(2) as WO Publication No. 2015/140270 A1, and which claims priority from, and the benefit of, French Application No. 1452303, filed on 20 Mar. 2014, the disclosures of which are incorporated herein by reference in their entireties.

BACKGROUND

1. Field

The disclosed embodiment relates to the field of structures that incorporate composite material parts that are assembled together.

More particularly, the disclosed embodiment relates to a process for assembling parts made from thermoplastic composite materials.

2. Brief Description of Related Developments

In the field of structures, it is known to produce thermoplastic composite material parts, that is to say parts in which the mineral or organic fibers are held in a reversible rigid matrix that becomes plastic starting from a certain temperature above their anticipated service temperatures.

The thermoplastic properties are in particular exploited during the manufacture of the parts and in particular the forming thereof.

The thermoplastic material parts, once made, are ally assembled in conventional manners by added-en fastening elements, for example rivets, or by adhesive bonding.

It is also known to produce assemblies of parts made of thermoplastic composite material by thermoplastic welding techniques.

In thermoplastic welding, the temperature of the parts to be assembled is raised above the melting point of the resin, the parts are placed in the position of the assembly and a pressure is exerted for a certain time until the resin cools in order to obtain mechanical bonding of the assembled zone.

It is thus known to place the parts in molds in order to heat the parts and to exert, in their joining zones, pressures between the parts in order to obtain the joining thereof.

These methods require a precise holding of the parts during the welding and involves a high energy consumption or the heating.

For heating the material at a temperature above the melting point of the thermoplastic resin, it is also known to provide heating energy by induction heating.

In this case, Foucault currents are generated at the interface to be welded by means of a head that produces by an alternating magnetic field. A metal element such as a wire mesh, in which the induced currents will be concentrated by the magnetic field and will produce heat by the Joule effect, is placed at the interface.

In order to carry out the assembly operation, the intimate contact of the parts is generally ensured by a local pressure of the head providing the heating energy and the head is displaced along the weld line.

In this thermoplastic welding fastening method, it is necessary for the pressure between the two parts to be produced for a sufficient time and it results from this requirement that the speed of displacement of the head, which exerts the pressure, and therefore the welding speed, is limited, which does not make it possible to obtain all the advantages of induction heating.

The use of electrically conductive wire meshes placed at the interface of the parts that have to be welded additionally has the drawback of creating temperature inhomogeneities, in particular at the ends of the welding lines, that are prejudicial to the quality of the welding and lead to assembled parts being rejected.

SUMMARY

The presently disclosed embodiment relates to a tooling device and a process for carrying out the welding of parts made of thermoplastic material and of resin of the same nature that provides an improved welding quality and a reduced time for producing the welds compared to the prior solutions.

The thermoplastic welding device, used for assembling at least one first part made of thermoplastic composite material, a matrix of which is essentially formed by a thermoplastic resin, and at least one second part made of thermoplastic composite material of a type similar to the composite material of the first part, comprises a magnetic induction head that provides the energy for heating the thermoplastic resin above its melting point in the zone of the weld.

The device comprises:
- a die for positioning the parts that have to be assembled, a nonmagnetic insulating insert of which defines bonding zones in which thermoplastic welds should be made;
- a bladder defining, between said bladder and the die, an airtight volume and means for producing a partial vacuum in said airtight volume;
- means for displacement of the magnetic induction head close to the bonding zones and without contact with the bladder.

A device is thus obtained that can simultaneously ensure the holding of the elements to be welded in position, the holding of the welded materials, the temperature of which is increased in an oxygen-depleted atmosphere, thus limiting the risk of oxidation of the heated materials, a separation of the functions of pressurizing the weld zone and of heating it, and finally the risk of displacing the parts during welding via a mechanical action is avoided due to the contactless displacement of the magnetic induction head.

Advantageously, the insulating insert comprises at least one cavity, a shape of which is suitable for holding at least one first part in position.

The positioning and the holding of the first part are thus facilitated and the risks of deformation of the first part during the rise in temperature thereof are limited.

Advantageously, the insulating insert is made from a machinable nonmagnetic polymer material. Any unwanted disturbance of the magnetic field, and also a loss of the heating energy provided by the magnetic induction head are thus avoided, while allowing complex shapes for the production of the cavities in the die.

In one aspect, the insulating insert is immobilized in a support made from a nonmagnetic metallic material. It is thus possible to produce a die, the insulating insert of which, comprising the cavities suitable for particular parts to be assembled, may be easily replaced and/or modified by being made from a relatively low-cost material, such as an epoxy resin.

In one aspect, shims are arranged on the insulating insert in the bonding zones in order to act as support for zones of the first parts that have to be bought to a melting point of the resin of the matrix of the composite material of the first part. The part for which the resin is bought to the melting point is thus separated from the insulating insert which is protected, giving it an improved operational service life.

The disclosed embodiment also relates to a process for the thermoplastic welding of at least one first part made of thermoplastic composite material with at least one second part made of thermoplastic composite material by melting the resin of the matrices by means of a magnetic induction head.

In order to obtain the anticipated benefits of the device of the disclosed embodiment, the process comprises successive steps of:

positioning at least one first part in a cavity, having a shape suitable for holding said at least one first part, of an insulating insert of a die of a thermoplastic welding tool, such as the tool of the disclosed embodiment;

placing metal inserts on the surfaces of the at least one first part corresponding to bonding zones that have to be welded;

positioning at least one second part on the die in the relative position that said at least one second part should have with the at least one first part in the assembly to be produced;

arranging a bladder so that said bladder and the die define an airtight volume wherein the at least one first part and the at least one second part are enclosed;

creating a partial vacuum in the airtight volume in order to create, under the effect of the pressure of the air outside the airtight volume, a bearing force of the at least one second part on the at least one first part, at least in the bonding zones;

contactless displacement of the magnetic induction head close to all the bonding zones so as to create in the metal inserts induced currents and a production of heat via the Joule effect so as to give rise to the local melting of the resin of the matrices of the composite material of the first and second parts, while maintaining the partial vacuum in the airtight volume;

after cooling the welded parts to an ambient temperature, or at least to a temperature substantially below a softening point of the resin of the material of said parts, breaking the partial vacuum, disassembling the bladder and removing the assembly of parts welded together from the tool.

In one aspect, the process comprises a step of placing shims between the insulating insert and the first parts in the bonding zones.

In one aspect, in order to improve the formation of the partial vacuum in the airtight volume, provision is made for a step of placing a drainage fabric inserted between the parts positioned on the die and the bladder, to ensure a suction of air throughout the airtight volume between said die and said bladder.

Advantageously, the metal inserts are impregnated, before being positioned, with a thermoplastic resin that is compatible with or of the same nature as the thermoplastic resin of the matrix of the composite material of the parts of the assembly to be produced.

The transmission of heat by the molten resin is thus improved and resin is provided at the interface of the welded parts, limiting the risk of the formation of bubbles or of a hollow space in the resin.

In one enhanced implementation of the process, in order to improve the homogeneity of the welding and the quality of the weld seam at its ends:

sacrificial parts are positioned at ends, following a direction for producing a weld seam, of the at least one first part in the cavity, formed for this purpose, made in the insulating insert;

the placing of metal inserts on the surfaces of the at least one first part is extended by extensions at ends of said metal insert on surfaces of said sacrificial parts;

a nonstick film is deposited between the extensions and each of the first parts and second parts with which said extensions are in contact in position in the tool;

the displacement of the magnetic induction head in order to produce the weld seam is extended at each of the ends of the weld seam on either side of a working length of said weld seam so as to begin and end the heating of the parts to be welded level with the sacrificial parts.

BRIEF DESCRIPTION OF THE DRAWINGS

The description and the drawings of one exemplary aspect of the disclosed embodiment will make it possible to better understand the objectives and advantages of the disclosed embodiment. It is clear that this description is given by way of example, and has no limiting nature.

In the drawings.

DETAILED DESCRIPTION

Figure 1A:
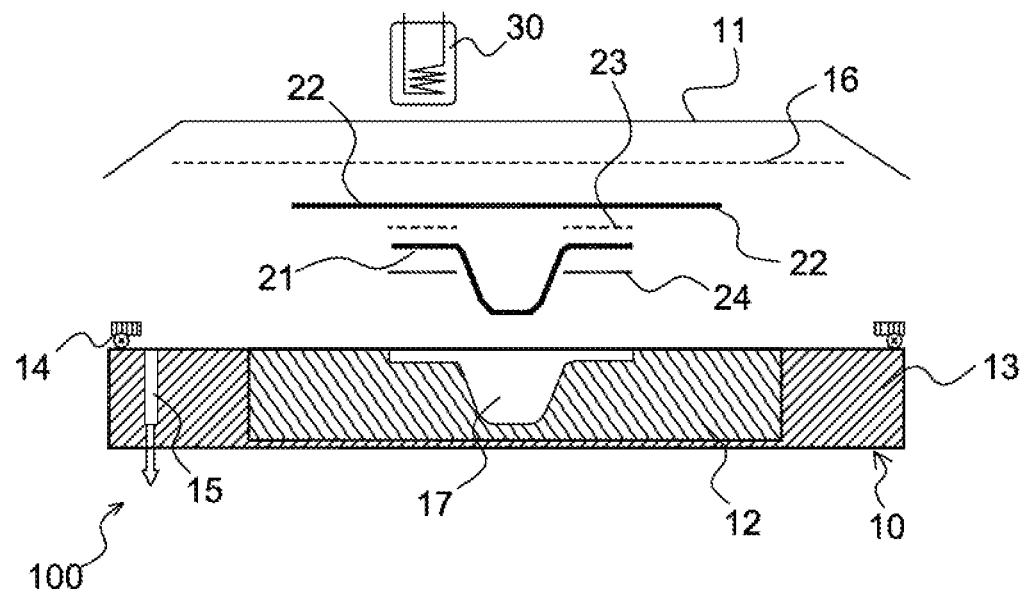
FIG. 1a represents the various portions of a tool according to the disclosed embodiment for the thermoplastic welding of thermoplastic composite material parts, the various elements of the tool and the elements to be assembled being represented separated.

FIG. 1a schematically presents, along a transverse cross section, the various elements of a tool 100 for assembling, by thermoplastic welding, thermoplastic composite material parts according to the disclosed embodiment.

In FIG. 1a, the various elements are separated from one another for illustrative purposes.

Figure 1B:
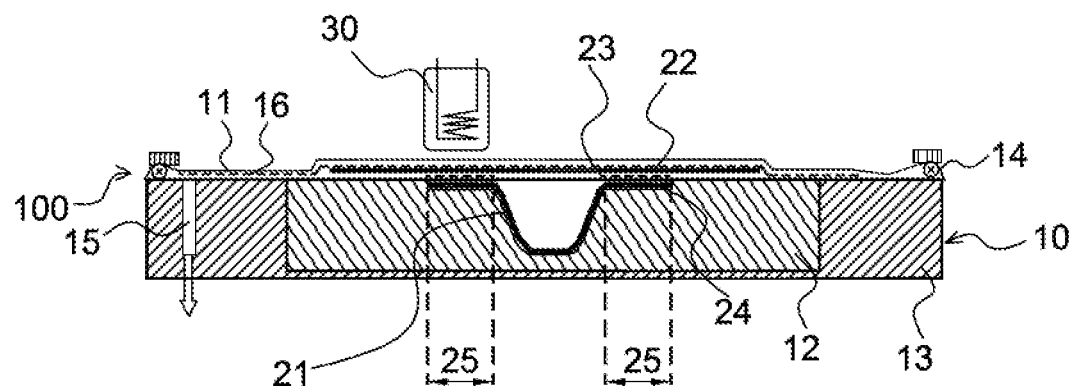
FIG. 1b represents the same elements as those represented in FIG. 1a, but in a position close to their positions when the welding operation is in progress.

In FIG. 1b, the same elements are found as those represented in FIG. 1a but in the position that they have during the welding and up to the extraction of the assembly produced by welding.

In FIGS. 1a and 1b, the scales are not respected between the various elements nor the proportions of each element, the drawings having only an illustrative purpose.

Figure 2:
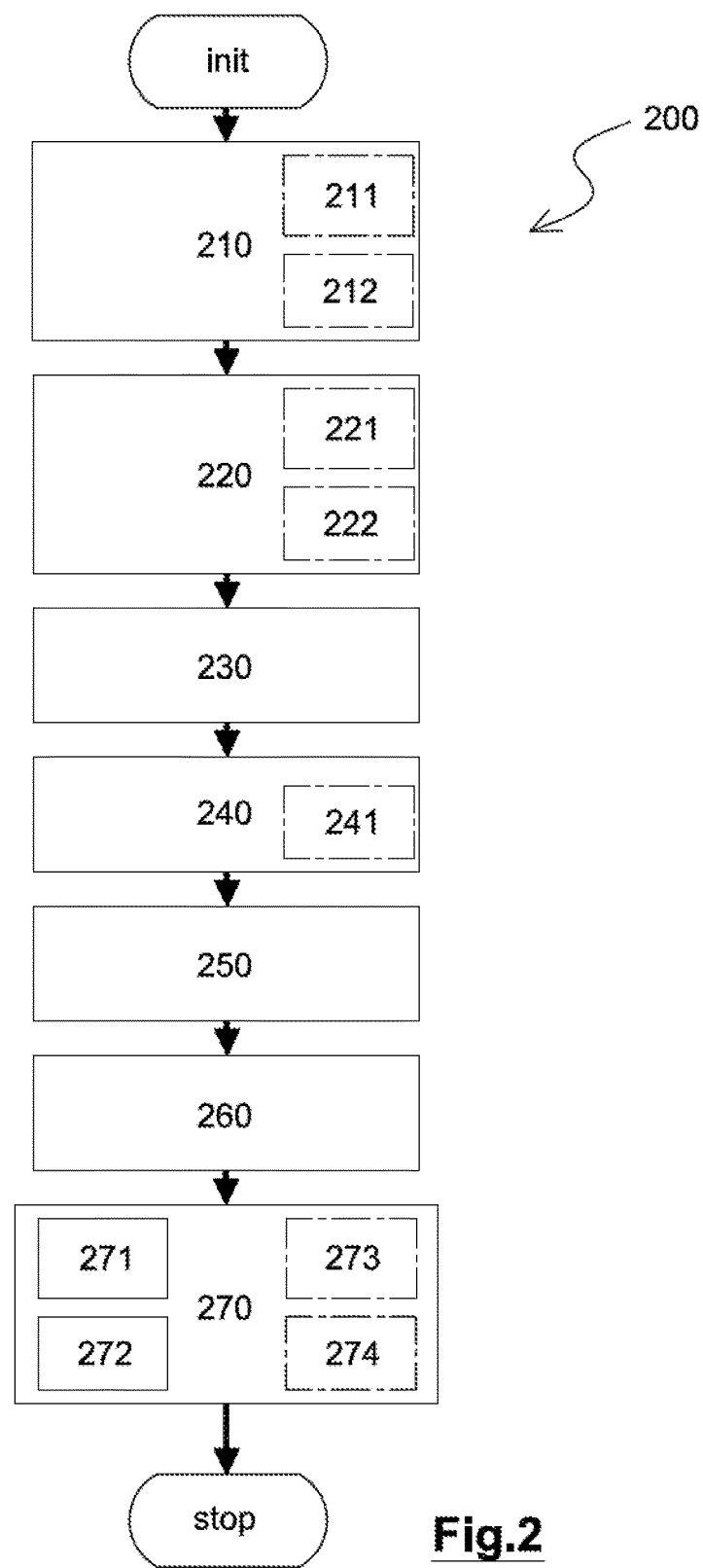
FIG. 2 represents a synoptic view of the process used for carrying out the thermoplastic welding with the tool represented in FIG. 1a and FIG. 1b.

FIG. 2 schematically presents the main steps of a thermoplastic welding process 200 according to the disclosed embodiment implemented by means of the tool from FIG. 1.

According to the assembly tool and the thermoplastic welding process, the parts to be assembled produced beforehand from thermoplastic composite material, are held in position on a die 10 by a bladder 11 that covers the parts, a partial vacuum being maintained between said die and said bladder.

As is represented in FIG. 1a and in FIG. 1b, the tool 100 comprises the die 10 that forms a rigid subassembly of said tool on which parts to be assembled by thermoplastic welding are positioned.

In this example, a first part 21 is illustrated in the form of a stiffener, seen in cross section perpendicular to the length of the stiffener in FIGS. 1a and 1b, and a second part 22 is illustrated in the form of a skin.

The die 10 is formed from nonmagnetic materials and comprises an insulating insert 12, which is thermally insulating, on which the parts to be assembled are positioned, so that at least one of the bonding zones 25 of said parts that have to be welded is located level with said insulating insert.

In one aspect, the insulating insert 12 is made from a rigid polymer resin, for example an epoxy resin which is nonmagnetic and advantageously which can be machined.

The insulating insert 12 comprises a cavity 17, held in which is at least one of the parts that has to be welded, in the example illustrated the stiffener corresponding to the first part 21.

The insulating insert 12 is held in a support 13 in order to provide, where necessary, the mechanical strength thereof when the tool is subjected to stresses in use. The support 13, made from a preferably nonmagnetic material, is for example made from an aluminum alloy.

The bladder 11 forms a substantially airtight flexible barrier that is attached to the die 10 at edges of said die by seals 14.

The die 10 and the bladder 11 define a closed volume in which the parts to be assembled by thermoplastic welding are found.

One or more suction orifices 15 are arranged, in the example in the support 13 of the die, in order to create a partial air vacuum in the closed volume between the die and the bladder.

The air vacuum considered here is an industrial air vacuum, that is to say corresponding to a reduced air pressure of the order of 100 millibar or less.

The partial vacuum results in a uniform pressure exerted by the atmospheric pressure on the bladder 11. Said flexible bladder is deformed so that the uniform pressure is exerted over the parts which, positioned on the die 10, are held in this position.

As illustrated in FIG. 1b, illustrating, in position on the tool 100, the parts to be assembled and also the various elements of the tool, the pressure exerted by the bladder 11 on the parts makes it possible to maintain a pressure on contact surfaces between the positioned parts, and in particular in the bonding zones 25.

In addition, a metal insert 23, for example in the form of a wire mesh, made from a magnetic material so that an induced current is created when said metal insert is subjected to a magnetic field, is placed between the surfaces of the parts that have to be welded, that is to say level with the bonding zones 25.

Advantageously, shims 24, for example shims made of polymer material, are arranged under said first part in the bonding zones 25 between the insulating insert 12, on which said first part is placed, and said first part.

A shim 24 makes it possible to separate the part from the insulating insert 12 in the zone subjected to heating during the welding operation.

A depth of the cavity 17 made in the insulating insert 12 takes into consideration a thickness of the shim 24, a thickness of the first part 21 and a thickness of the metal insert 23 so that a positive interference is ensured with the second part 22 when the parts are in position on the tool.

In one exemplary aspect, the shim 24 is formed by a polymer film having a thickness of around 50 micrometers, the metal insert 23 is a wire mesh having a thickness of between 0.2 and 0.3 millimeter, and, by taking into account the thickness of the part, the shim and the metal insert, a positive interference of 50 micrometers to 100 micrometers is sought.

The tool 100 also comprises a magnetic induction head 30 that is mobile with respect to the die 10.

The magnetic induction head 30 generates a magnetic field that is regulated so that the currents are predominantly induced and concentrated in the metal insert 23 when said metal insert is subjected to the magnetic field of said magnetic induction head.

The magnetic induction head 30 is mobile so as to be able to be displaced without contact close to the die on which the parts to be welded are positioned and the bladder 11, at least close, in the example illustrated above, to the zones 25 that have to be welded.

The advantage of maximizing the Joule effect produced by the magnetic field in the metal insert 23 so as to bring the temperature rapidly to the melting point of the thermoplastic resin in a welding zone should be noted. For this, it is advantageous to increase the induced power leads to a maximum of the "resistivity"×"magnetic permeability" product of the material of the metal insert 23 being sought, the frequency of the alternating magnetic field being adjusted to take into consideration its effect on the depth of field of the heating.

The material of the metal insert 23 is for example a ferritic stainless steel that meets these requirements of good magnetic permeability and high resistivity.

The displacements of the magnetic induction head 30 are advantageous carried out by a robot, not illustrated in the figures, suitable for the movements that have to be carried out by said magnetic induction head.

In order to assemble thermoplastic composite material parts means of the tool 100, use is made of the process 200 comprising the successive steps of:

positioning 210 at least one first part 21 in a cavity 17, having a shape suitable for holding said at least one first part, made in an insulating insert 12 of a die 10 of the tool 100;

placing 220 metal inserts 23 on the surfaces of the at least one first part 21 corresponding to bonding zones 25 that have to be welded;

positioning 230 at least one second part 22 on the die 10 in the relative position that said at least one second part should have with the at least one first part in the assembly to be produced;

arranging 240 a bladder 11 so that said bladder and the die 10 define an airtight volume wherein the at least one first part and the at least one second part are enclosed, where necessary with insertion 241 of a drainage fabric 16 to ensure a suction of air throughout the airtight volume formed sunder the bladder;

creating a partial vacuum 250 in the airtight volume in order to create a bearing force of the at least one second part on the at least one first part, which force results from the difference in pressure exerted on the bladder 11 between the atmospheric pressure and the pressure in said airtight volume;

contactless displacement 260 of a magnetic induction head 30 close to all the bonding zones 25, the power and the speed of displacement of said magnetic induction head being adjusted in order to provide, at any point of said bonding zones, the energy necessary for raising the temperature of the resin of the materials of the parts to be welded so as to give rise to the local melting of said resin, while maintaining the partial vacuum in the airtight volume;

after cooling the welded parts to an ambient temperature, or at least to a temperature substantially below a softening point of the resin of the material of said parts, breaking 271 the partial vacuum, disassembling 272 the bladder 11 and removing 270 the assembly of parts welded together from the tool 100.

According to the process 200, the parts are thus positioned before carrying out the welding and held in their desired relative positions by the pressure, resulting from the partial vacuum in the airtight volume between the bladder 11 and the die 10, exerted in a static manner in order to keep the bonding zones of the parts to be assembled in contact with one another. The partial vacuum is created, and therefore the pressure is applied to the parts, before the start of the welding operation and until after the end of the welding, the thermoplastic welding being carried out dynamically by displacement of the magnetic induction head while the pressure is static.

As a result of this process the parts to be assembled are held perfectly immobile during the welding and are not subjected to forces capable of giving rise to a displacement of one part with respect to another.

This result is achieved even better due to the fact that the magnetic induction head 30 is displaced without contact, unlike the known processes in which the induction head simultaneously exerts a pressure at the location heated for the purpose of producing a weld seam.

Also obtained by the process of the disclosed embodiment is a decorrelation of the maintaining of the pressure, which ensures the welding of the parts during the phase in which the resin is molten, and of the heating of the resin at the weld locations. Thus, the magnetic induction head 30 may be displaced along the zones to be welded as rapidly as possible, provided there is a sufficient supply of energy to bring the resin to its melting point, without it being necessary to wait for the local pressure to have been applied for a sufficient time to ensure the welding before displacing said magnetic induction head.

Moreover, carrying out the heating of the resin for creating the weld in a volume where a partial vacuum is created beforehand, a risk of oxidation of the resin, brought to a melting point, is limited due to a reduced amount of oxygen in the airtight volume where the welding zones are found.

In one aspect of the process, shims 24 are placed 211 between the insulating insert 12 and the first part 21 at the bonding zones 25 of said first part. The shims 24 make it possible to avoid direct contact between the resin of the first part, subjected to melting, and the insulating insert 12 of the die. The shims are also selected in terms of thickness in order to guarantee a positive interference between the first part on which the metal insert 23 is placed and the second part.

The shims are for example made from a thin polymer film, for example having a thickness of less than 100 micrometers.

In one aspect, the metal insert 23, that is for example in the form of a wire mesh, or else a metal fabric, having a thickness of several tenths of a millimeter, for example two to three tenths of a millimeter, is impregnated 221 with a resin of the same nature as the resin of the material of the parts that have to be assembled.

A resin of the same nature should be understood to be a chemically compatible resin having a similar, if not identical, melting point to that of the resin of the material of the parts to be assembled.

The impregnation 221 of the metal insert with the resin may be carried out at any time before the insert is between the two parts that have to be assembled.

For example, the metal insert is impregnated with resin in an upstream step before the arranging of the parts on the tool.

Figure 3:
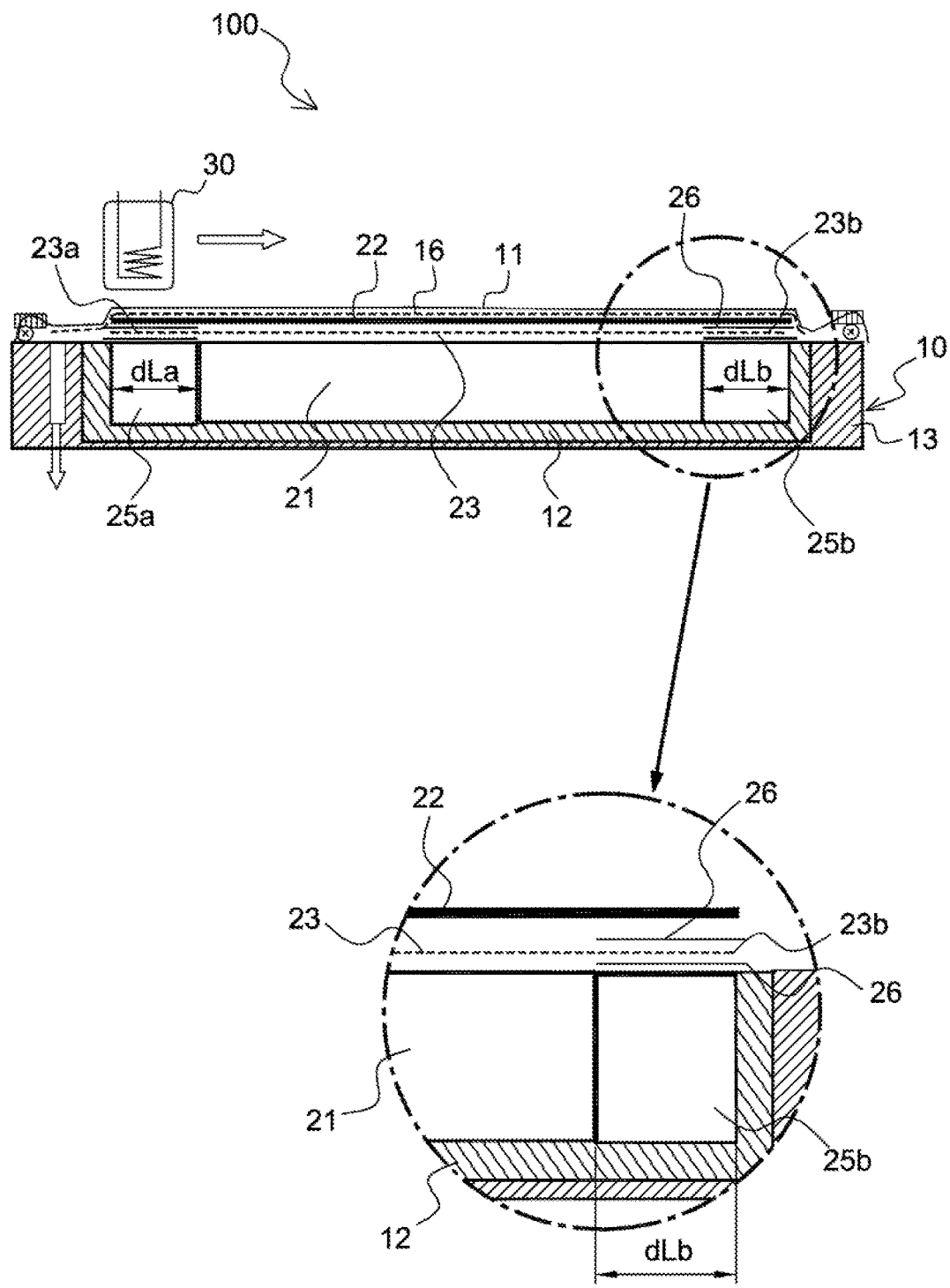
FIG. 3 illustrates, along a section of a length of a weld seam, a detail of the tool for the implementation of an enhancement of the process that improves the quality of the welds at the ends of a weld seam.

In one aspect of the process, illustrated in FIG. 3, the metal insert 23, considered along a length of the weld to be produced, has a dimension substantially greater than the length of the weld.

The length of the weld is defined by the direction of displacement of the magnetic induction head 30, depicted in FIG. 3 by the arrow associated with said magnetic induction head, and corresponds in the example illustrated to the length of the stiffener, that is to say of the first part 21.

As illustrated in FIG. 3, extensions 23a, 23b of the metal insert 23 jut out at each of the ends of the first part 21 an extension length dLa, respectively dLb.

In addition, sacrificial parts 25a, 25b are placed 212 substantially in the continuity of the first part 21, a length of each of said sacrificial parts corresponding substantially to the extension length dLa, respectively dLb, of the extension of the metal insert located on the same side of the first part.

The sacrificial parts are produced with dimensions in cross section similar to that of the first part and with a material having similar characteristics, that is to say with the same composite material or a material having related characteristics.

It is understood here that the cavity 17 is consequently produced so that the sacrificial parts can be placed therein at the ends of the first part.

A nonstick film 26 is also deposited 222 at the interfaces between the extensions 23a, 23b of the metal insert 23 and the sacrificial parts 25a, 25b on the one hand and at the interfaces between the extensions 23a, 23b of the metal insert 23 and the second part 22 on the other hand.

The nonstick film 26 is a heat conductive film that creates a barrier for the molten resin during the welding and thus prohibits welding between the sacrificial parts and the second part.

The nonstick film 26 is for example a polyimide film that is several tens of microns thick, the thickness of which will be taken into consideration in the creation of the sacrificial parts 25a, 25b and/or of the cavity 17.

When a weld seam is produced by displacement of the magnetic induction head 30, the displacement of said active magnetic induction head is started substantially at a first end of the metal insert 23, for example above the extension 23a of said metal insert, and therefore above the sacrificial part 25a, and is interrupted substantially at the other end of the metal insert 23, therefore above the other extension 23b of said metal insert, and above the sacrificial part 25b.

When the assembly of parts is extracted from the tool after the creation of the weld, the sacrificial parts 25a, 25b, which have not adhered to the second part due to the presence of the nonstick film, are removed 273 and the excess of metal insert formed by the extensions 23a, 23b, which is not trapped in the weld, may be removed 274.

This enhancement of the process makes it possible to shift, outside of the weld of the parts, the inhomogeneities linked to the disturbances of the magnetic field and to the conditions at the boundaries that characterize the start and end of the weld, which is sensitive to the magnetic elements, and that do not make it possible to guarantee a uniform distribution of the energy at the ends of the trajectory of the magnetic induction head 30.

It results therefrom that the useful portion of the weld is formed under homogeneous conditions over its entire length.

The lengths of extensions dLa and dLb are for example of the order of a hundred millimeters, their lengths not however being critical. Since the length may depend on particular conditions linked to the parts, to the tool and to the magnetic induction head, advantageously the length will be defined or at least confirmed experimentally in each scenario.

In the example illustrated, the second part 22 is represented flat but the process can be applied to all shapes of curved or awkward parts that can be positioned on a die, the shape of which is in this case adapted.

It is also possible to adapt the principles disclosed without departing from the disclosed embodiment.

The device of the disclosed embodiment process thus make it possible to produce strong assemblies of thermoplastic composite material parts avoiding resorting to added-on fastenings.

What is claimed is:

1. A thermoplastic welding device for assembling at least one first part made of thermoplastic composite material, a matrix of which is essentially formed by a thermoplastic resin, and at least one second part made of thermoplastic composite material of a type similar to the composite material of the first part, comprising:
    a magnetic induction head configured to induce current through a metal insert positioned in-between the at least one first part and the at least one second part in predetermined bonding zones corresponding to an interface between the at least one first part and the at least on second part where a thermoplastic weld seam is formed;
    a die configured for positioning the parts to be assembled including a nonmagnetic metallic support and a nonmagnetic insulating insert disposed within the support, where the nonmagnetic insulating insert defines the predetermined bonding zones in which thermoplastic weld seams are formed;
    a bladder defining, between said bladder and the die, an airtight volume and means for producing a partial vacuum in said airtight volume;
    means for displacement of the magnetic induction head close to the bonding zones and without contact with the bladder;
    wherein sacrificial parts are positioned at ends, following a direction for producing a weld seam, of the at least one first part in the cavity, formed for this purpose, made in the insulating insert,
    the device further comprising extensions located at ends of said metal insert on surfaces of said sacrificial parts; and,
    a nonstick film deposited between the extensions and each of the first parts and second parts with which said extensions are in contact in position in the tool.

2. The device as claimed in claim 1, wherein the insulating insert comprises at least one cavity, a shape of which is suitable for holding at least one first part in position.

3. The device as claimed in claim 2, wherein the insulating insert is made from a machinable nonmagnetic polymer material.

4. The device as claimed in claim 1, wherein the insulating insert is immobilized in the support made from nonmagnetic metallic material.

5. The device as claimed in claim 1, wherein shims are arranged on the insulating insert in the bonding zones in order to act as support for zones of the first parts that have to be bought to a melting point of the resin of the matrix of the composite material of said first part.

6. A process for the thermoplastic welding of at least one first part made of thermoplastic composite material with at least one second part (made of thermoplastic composite material by melting the resin of the matrices of said at least one first part and at least one second part by means of a magnetic induction head, comprising the successive steps of:
    positioning at least one first part in a cavity, having a shape suitable for holding said at least one first part, of an insulating insert disposed within a nonmagnetic metallic support of a die of a thermoplastic welding tool, the insulating insert corresponding to an interface between the at least one first part and the at least one second part where a thermoplastic weld seam is formed;
    placing metal inserts on the surfaces of the at least one first part corresponding to the bonding zones in which thermoplastic weld seams are formed;
    positioning at least one second part on the die in the relative position that said at least one second part should have with the at least one first part in the assembly to be produced;
    arranging a bladder so that said bladder and the die define an airtight volume wherein the at least one first part and the at least one second part are enclosed;
    creating a partial vacuum in the airtight volume in order to create, under the effect of the pressure of the air outside the airtight volume, a bearing force of the at least one second part on the at least one first part, at least in the bonding zones;
    contactless displacement of the magnetic induction head close to all the bonding zones so as to create in the metal inserts induced currents and a production of heat via the Joule effect so as to give rise to the local melting of the resin of the matrices of the composite material of the first and second parts, while maintaining the partial vacuum in the airtight volume; and,
    after cooling the welded parts to an ambient temperature, or at least to a temperature substantially below a softening point of the resin of the material of said parts, breaking the partial vacuum, disassembling the bladder and removing the assembly of parts welded together from the tool,
    wherein:
    sacrificial parts are positioned at ends, following a direction for producing a weld seam, of the at least one first part in the cavity, formed for the purpose, made in the insulating insert;
    the placing of metal inserts on the surfaces of the at least one first part is extended by extensions at ends of said metal insert on surfaces of said sacrificial parts;
    a nonstick film is deposited between the extensions and each of the first parts and second parts with which said extensions are in contact in position in the tool;
    the displacement of the magnetic induction head in order to produce the weld seam is extended at each of the ends of the weld seam on either side of a working length of said weld seam so as to begin and end the heating of the parts to be welded level with the sacrificial parts.

7. The process as claimed in claim 6, comprising a step of placing shims between the insulating insert and the first parts in the bonding zones.

8. The process as claimed in claim 6, comprising a step of placing a drainage fabric inserted between the parts positioned on the die and the bladder, to ensure a suction of air throughout the airtight volume between said die and said bladder.

9. The process as claimed in claim 6, wherein the metal inserts are impregnated, before being positioned, with a thermoplastic resin that is compatible with the thermoplastic resin of the matrix of the composite material of the parts of the assembly to be produced.

* * * * *